April 19, 1949.　　　　H. E. CONEY　　　　2,467,813
VACUUM BRAKE SYSTEM

Filed Sept. 23, 1946　　　　　　　　　　2 Sheets-Sheet 1

Inventor
HERMAN E. CONEY

By *Clarence A. O'Brien
and Harvey B. Jacobson*
Attorneys

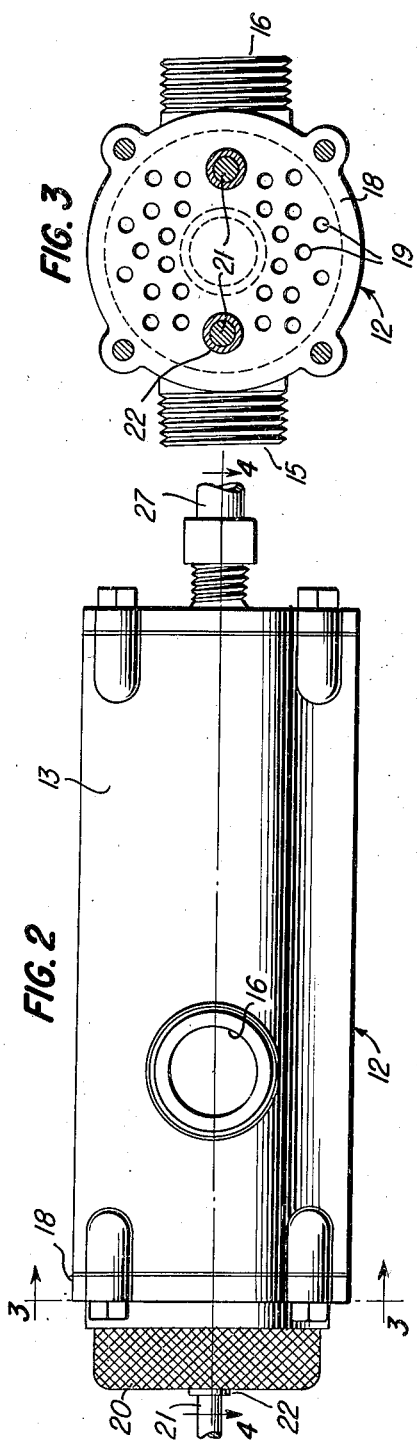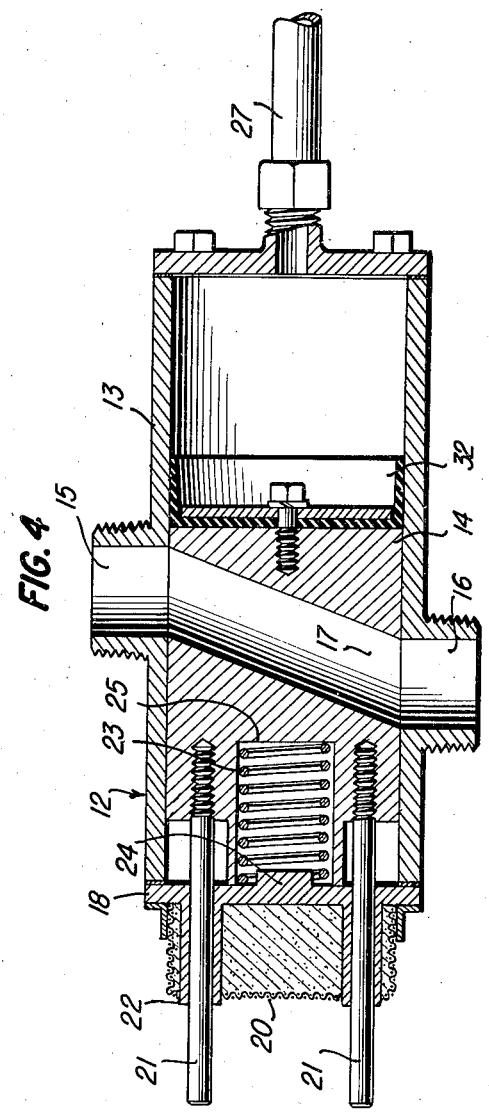

Patented Apr. 19, 1949

2,467,813

UNITED STATES PATENT OFFICE 2,467,813

VACUUM BRAKE SYSTEM

Herman E. Coney, Watsonville, Calif., assignor of one-half to Marion G. Phillips, Salinas, Calif.

Application September 23, 1946, Serial No. 698,757

5 Claims. (Cl. 188—152)

This invention relates to vacuum brake systems for automotive vehicles, and particularly to such a system wherein a suction applied brake is provided for each of a plurality of the ground wheels of the vehicle including a suction operated power actuator for each brake local to the latter, and wherein pipe connections are provided between a reserve vacuum tank and the power actuators of said brakes.

Heretofore, it has been the practice to vacuumize the long pipe connections for applying the brakes, and to devacuumize them for releasing the brakes by the admission of air to the pipe connections and simultaneously cutting off communication of the latter with the reserve vacuum tank at a point adjacent the latter and remote from the brakes and the local power actuators thereof. As a result of this practice, the brakes have been sluggish in action, application and release of the brakes being delayed rather than instantaneous.

The primary object of the present invention, therefore, is to provide means whereby instantaneous application and release of the brakes is had. I accomplish this result by means of an arrangement which permits direct cutting off of communication between the power actuators of the brakes and the pipe connections and simultaneous direct admission of atmospheric air to said actuators, or vice versa.

A further object of the invention is to provide means whereby faulty brakes may be readily eliminated from the system in such a manner that the remaining brakes will remain operative to permit safe travel until the faulty brake can be repaired.

More specific objects and features of the invention will become apparent from the following description when considered in connection with the accompanying drawings, in which:

Figure 2 is an enlarged elevational view of one of the valves provided in the pipe connections adjacent to power actuator of each brake.

Figure 3 is a transverse section taken on line 3—3 of Figure 2.

Figure 4 is a central longitudinal section taken on line 4—4 of Figure 2.

Figure 1:
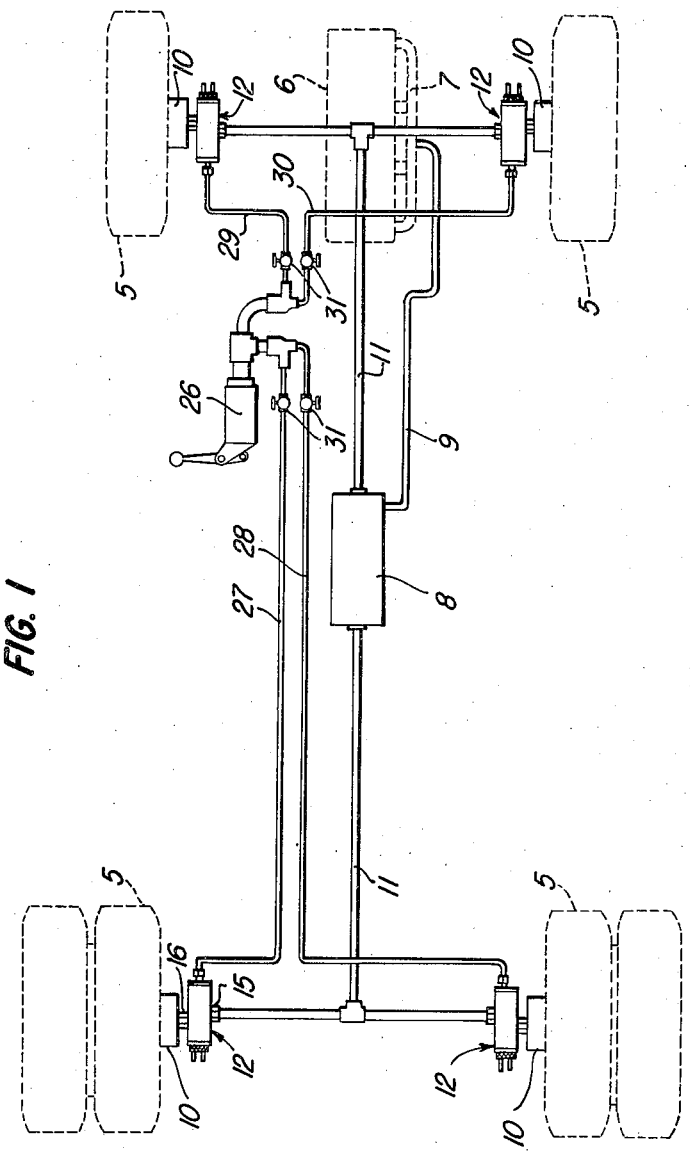
Figure 1 is a diagrammatic plan view of an automotive vehicle equipped with a vacuum brake system constructed in accordance with the present invention.

Referring in detail to the drawings, 5 indicates the ground wheels of an automotive vehicle having a power plant including an internal combustion engine 6 provided with the usual intake manifold 7. The brake system includes the usual reserve vacuum tank 8 connected by the main line 9 with the intake manifold 7, as a source of suction. Each of a plurality of the ground wheels 5 is provided with a conventional brake 10 which is of the type having a suction operated power actuator local to said brake. Pipe connections 11 are provided between the reserve vacuum tank 8 and the brakes 10.

In accordance with the present invention, special valves 12 are provided in the connections 11, one adjacent the actuator of each brake. Each valve 12 comprises a cylindrical casing 13 having a movable valve member 14 of the piston type reciprocable therein. Casing 13 has a port 15 for connection with the pipe connection 11 and a port 16 for connection with the brake actuator, said ports 15 and 16 being staggered or in different transverse planes. Also, the movable valve member 14 has an oblique transverse passage 17 which, in one position or limit of movement of valve 14 provides communication between the ports 15 and 16 as shown in Figure 4. The valve 14 is moved to this position by fluid under pressure forced into one end of casing 13, as and by the means later described. The other end of casing 13 is closed by a head 18 having numerous perforations 19 over which is secured a suitable air strainer or filter 20. Guide rods 21 project from the adjacent end of valve 14 and slidably extend through guides 22 rigid with and projecting outwardly from the head or plate 18. Valve 14 is moved in the opposite direction to another position or limit of movement by means of a helical compression spring 23 interposed between the head 18 and the adjacent end of valve 14. Spring 23 receives a locating lug 24 of head 18 at one end and is disposed within an axial socket 25 of valve 14 at the other end. When valve 14 is moved to the limit of its movement in one direction by spring 23, it uncovers port 16 but keeps the port 15 closed, thereby cutting off communication between the brake actuator and the vacuum pipe connection 11, but admitting atmospheric air directly to the brake actuator through perforations 19 and port 16. Obviously, when the valve 14 is in the position of Figure 4, it cuts off communication between port 16 and the atmosphere and simultaneously establishes communication between the pipe connection 11 and the brake actuator.

Located in the driver's compartment of the vehicle is a manually operable pump 26 having its outlet connected by separate lines 27, 28, 29, and 30 with the ends of the casings 13 of the respective valves 12 remote from those ends at which the springs 23 are located. The lines 27, 28, 29, and 30 and the cylinder of pump 26 are filled with oil or other liquid, and the capacity of the cylinder of pump 26 is sufficient to force liquid through the lines 27, 28, 29, and 30 for simultaneous actuation of the valve members 14 and all of the valves 12. The arrangement is such that when the piston of pump 26 is actuated in one direction, the liquid is forced into the casings 13 of the valves 12 for moving the valve members 14 thereof to the position of Figure 4 against the action of the associated springs 23. This establishes communication between the actuators of the brakes and the vacuum lines or connections 11, thereby applying the brakes. On the other hand, when the piston of pump 26 is retracted, fluid pressure is relieved from the valves 14 so as to permit the springs 23 of the valves 12 to move the valve members of the latter to their other limit of movement wherein communication is cut off between the valve actuators and the lines or connections 11 and communication is simultaneously established directly between the brake actuators and the atmosphere by way of apertures 19 and port 16. This results in instantaneous release of the brakes because there is no delayed action due to de-vacuumizing the lines or connections 11. The same instantaneous action is had when applying the brakes, there being always suction in the connections or lines 11 to the points where the ports 15 of the valves 12 are located.

A shut off valve 31 is provided in each of the lines 27, 28, 29, and 30, within the convenient reach of the operator of the vehicle. Thus, should any one or more of the brakes tend to become faulty in operation, it can be eliminated from active use in the system by closing the desired one or ones of the valves 31 after pressure is removed from the casing or casings 13 of the valve or valves 12 adjacent to the faulty brake or brakes and allowing the valve or valves 14 thereof to be moved to the position effected by spring or springs 23, wherein communication is cut off between the actuator of the faulty brake and the connections or lines 11. Accordingly, this provides a safety feature by means of which the system may be continued in use with only the efficient brakes in action and until such time as the faulty brake or brakes can be repaired. Preferably, the end of valve 14 adjacent that end of casing 13 where pressure fluid is introduced, is provided with a cup packing 32 to prevent leakage of the pressure fluid past said valve 14. Filter 20 excludes objectionable dust and other foreign matter from the brake actuators.

From the foregoing description, it is believed that the construction, operation and advantages of the present invention will be readily understood and appreciated by those skilled in the art. Modifications and changes in details of construction are contemplated, such as fall within the scope of the invention as claimed.

What I claim is:

1. The combination with an automotive vehicle having a normally released suction applied brake for each of a plurality of the ground wheels thereof including a suction operated power actuator for each brake local to the latter, a reserve vacuum tank, and pipe connections between the reserve vacuum tank and the power actuators of said brakes, of valves in said connections, one adjacent each brake, each valve including a valve member movable to one position for admitting air from the atmosphere directly to the actuator of the adjacent brake through said valve and simultaneously cutting off communication between said actuator and the reserve vacuum tank to release the brake, and movable to another position for cutting off communication of said actuator with the atmosphere and simultaneously establishing communication between said actuator and the reserve vacuum tank to apply the brake, spring means for moving each valve member to one of said positions, and power means for simultaneously moving the movable valve members of all of the valves to the other of said positions.

2. The combination with an automotive vehicle having a normally released suction applied brake for each of a plurality of the ground wheels thereof including a suction operated power actuator for each brake local to the latter, a reserve vacuum tank, and pipe connections between the reserve vacuum tank and the power actuators of said brakes, of valves in said connections, one adjacent to each brake, each valve including a valve member movable to one position for admitting air from the atmosphere directly to the actuator of the adjacent brake through said valve and simultaneously cutting off communication between said actuator and the reserve vacuum tank to release the brake, and movable to another position for cutting off communication of said actuator with the atmosphere and simultaneously establishing communication between said actuator and the reserve vacuum tank to apply the brake, spring means for moving each valve member to the first named position, and power means for simultaneously moving the movable valve members of all of the valves to the second named position.

3. The construction defined in claim 2, wherein said power means includes a manually operable hydraulic pump located within convenient reach of the driver of the vehicle, and separate lines leading from said pump to each of said valves for actuation of the movable valve members thereof.

4. The construction defined in claim 2, wherein said power means includes a manually operable hydraulic pump located within convenient reach of the driver of the vehicle, separate lines leading from said pump to each of said valves for actuation of the movable valve members thereof, and a shut off valve in each of said fluid lines adjacent to said pump.

5. The combination with an automotive vehicle having a normally released suction applied brake for each of a plurality of the ground wheels thereof including a suction operated power actuator for each brake local to the latter, a reserve vacuum tank, and pipe connections between the reserve vacuum tank and the power actuators of said brakes, of valves in said connections, one adjacent each brake, each valve including a casing having ports at opposite sides respectively connected with the suction operated power actuator of the adjacent brake and with a suction pipe connection leading to said reserve vacuum tank, a piston type valve member reciprocable in said casing and movable to one position for establishing communication between said ports, said casing having openings in one end for admission of atmospheric air, a spring for moving said valve member to another position for establishing communication between the brake actuator and the atmosphere through said openings and simultaneously cutting off communication thereof with the reserve vacuum tank, and hydraulic means including a fluid pressure supply pipe connected to the other end of said casing for actuating said movable valve member to the first named position.

HERMAN E. CONEY.

REFERENCES CITED

The following references are of record in the file of this patent:

UNITED STATES PATENTS

| Number | Name | Date |
|---|---|---|
| 821,870 | Hildebrand | May 29, 1909 |
| 1,196,121 | Larsen | Aug. 29, 1916 |
| 1,224,221 | Schwanbeck | May 1, 1917 |
| 1,695,194 | Lansinger | Dec. 11, 1928 |
| 1,851,274 | Coates | Mar. 29, 1932 |
| 1,962,857 | Cash | June 12, 1934 |
| 2,076,532 | Francoeur et al. | Apr. 13, 1937 |
| 2,373,272 | Stelzer | Apr. 10, 1945 |